(No Model.) 3 Sheets—Sheet 1.
C. C. BRADLEY.
REACH COUPLING FOR VEHICLES.
No. 498,421. Patented May 30, 1893.
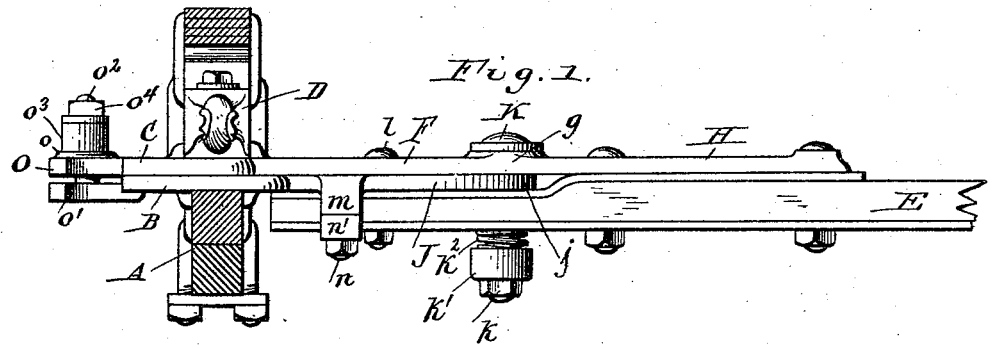
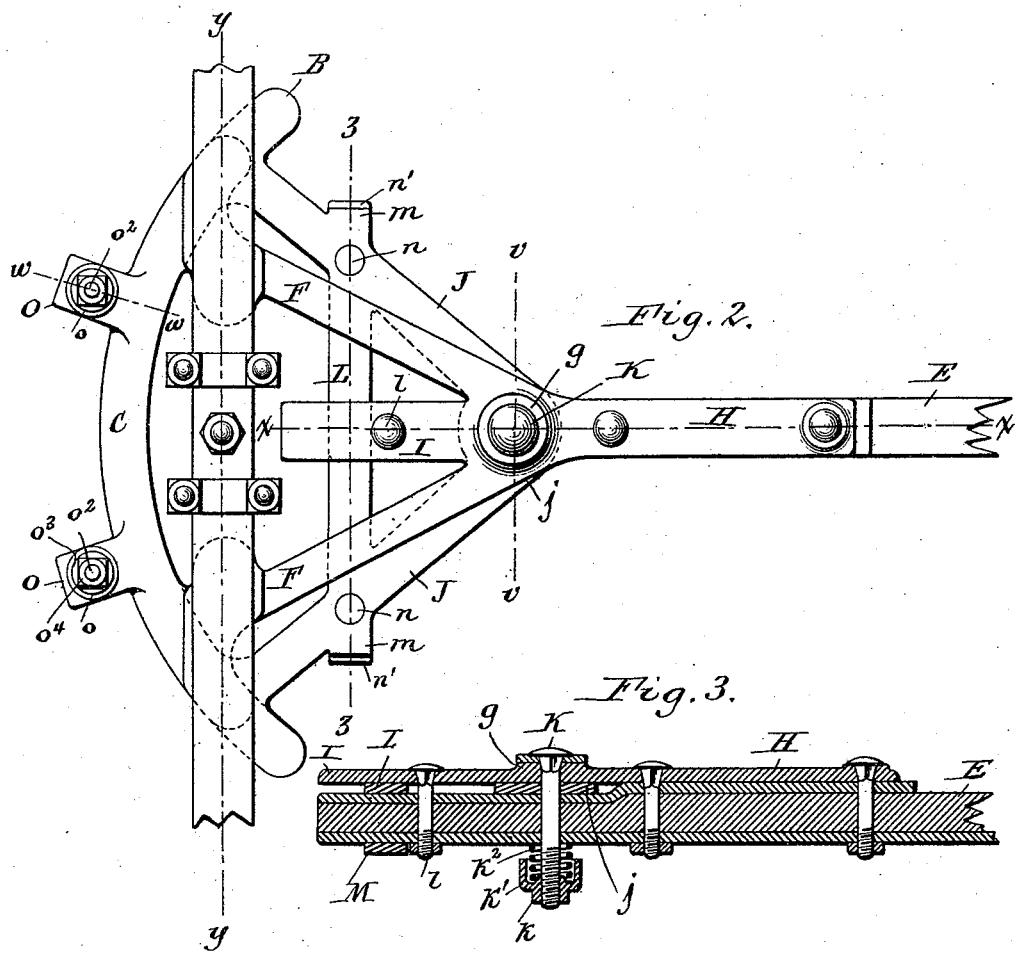
Witnesses:
Emil Neuhart
Theo. L. Popp
C. C. Bradley Inventor.
By Wilhelm Bonner
Attorneys.

(No Model.) 3 Sheets—Sheet 2.

C. C. BRADLEY.
REACH COUPLING FOR VEHICLES.

No. 498,421. Patented May 30, 1893.

Witnesses:
Emil Neuhart
Friedrich Gustav Wilhelm

C. C. Bradley    Inventor
By Wilhelm Bonner
    Attorneys.

(No Model.) 3 Sheets—Sheet 3.
C. C. BRADLEY.
REACH COUPLING FOR VEHICLES.
No. 498,421. Patented May 30, 1893.
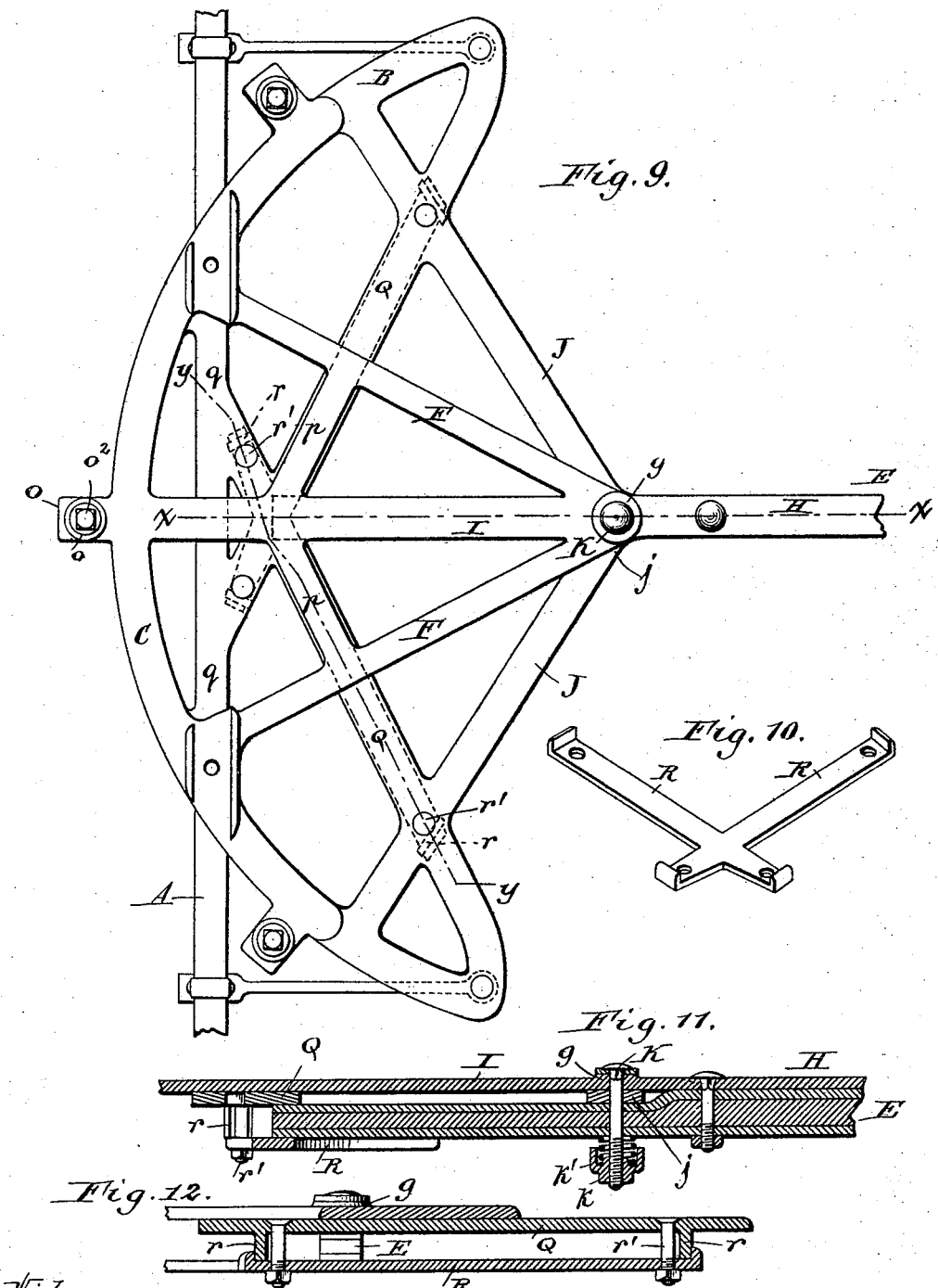

UNITED STATES PATENT OFFICE.

CHRISTOPHER C. BRADLEY, OF SYRACUSE, NEW YORK.

REACH-COUPLING FOR VEHICLES.

SPECIFICATION forming part of Letters Patent No. 498,421, dated May 30, 1893.

Application filed July 20, 1892. Serial No. 440,646. (No model.)

*To all whom it may concern:*

Be it known that I, CHRISTOPHER C. BRADLEY, a citizen of the United States, residing at Syracuse, in the county of Onondaga and State of New York, have invented new and useful Improvements in Reach-Couplings, of which the following is a specification.

This invention relates to that class of reach couplings or running gears for vehicles in which the pivotal connection between the reach and the front axle is located in rear of the latter, thereby permitting the vehicle to turn shorter than when the pivotal connection is made in the front axle.

The object of my invention is to produce a simple and durable reach coupling of this character and to provide means whereby the wear upon the working parts of the coupling is automatically taken up to prevent rattling.

Figure 4:
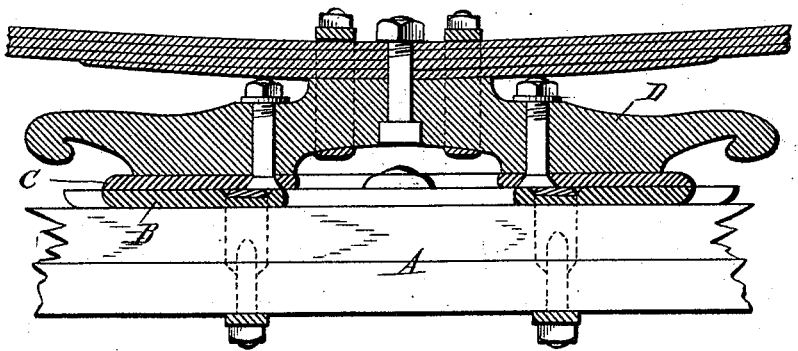
Figure 5:
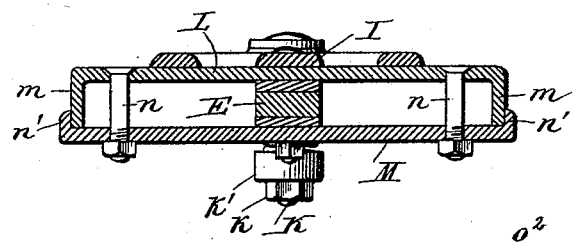
Figure 6:
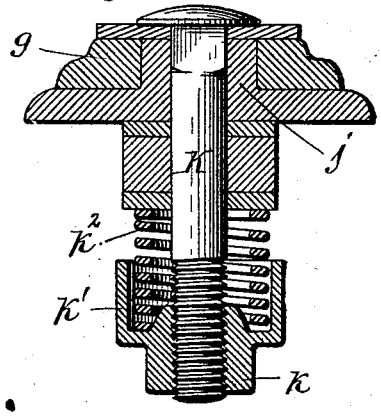
Figure 7:
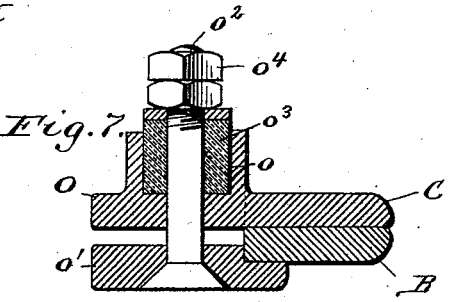
Figure 8:
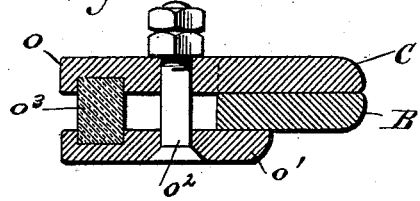

In the accompanying drawings consisting of three sheets:—Figure 1 is a sectional side elevation of my improved reach coupling. Fig. 2 is a top plan view thereof. Fig. 3 is a fragmentary longitudinal section in line $x$—$x$, Fig. 2. Figs. 4 and 5 are vertical transverse sections in lines $y$—$y$, and $z$—$z$, Fig. 2 respectively. Figs. 6 and 7 are vertical cross sections, on an enlarged scale, in lines $v$—$v$, and $w$—$w$, respectively. Fig. 8 is a section similar to Fig. 7, showing a modified construction of the device for taking up the wear upon the segments. Fig. 9 is a top plan view of a reach coupling for heavy draft vehicles, embodying my invention. Fig. 10 is a perspective view, on a reduced scale, of the spring clamping bars used in connection with the modified reach coupling shown in Fig. 9. Fig. 11 is a fragmentary longitudinal section in line $x$—$x$, Fig. 9. Fig. 12 is a vertical transverse section in line $y$—$y$, Fig. 9.

Like letters of reference refer to like parts in the several figures.

A represents the front axle, B the lower segment of the fifth wheel secured to the axle, C the upper segment thereof, D the head block secured to the upper segment, and E the reach. The main portions of the segments are arranged in front of the head block and axle when the parts are in their normal position, as shown in Figs. 1 and 2. The upper segment is provided with two rearwardly converging arms F which terminate in an eye $g$ arranged in rear of the axle. This eye is provided with a rearwardly extending coupling iron H which is secured to the upper side of the reach and with a tongue I projecting forwardly between the arms F of the upper segment.

J represents two rearwardly converging arms which are formed on the lower segment and which terminate in an eye $j$ arranged below the eye $g$. The front portion of the reach is depressed and arranged underneath the lower segment and terminates in rear of the front axle.

K represents the king bolt which passes through the eyes $g$ and $j$ of the upper and lower segments and through an opening in the reach, Figs. 1, 2 and 3.

$k$ represents a screw nut applied to the lower screw threaded end of the king bolt and provided on its upper side with a socket or cup $k'$.

$k^2$ represents a spiral spring surrounding the lower portion of the king bolt and bearing with its ends against the cup and the under side of the reach, as represented in Figs. 3 and 6. The spring $k^2$ is strained so as to constantly draw the arms of the segments and the reach together, thereby taking up wear between these parts and preventing them from rattling.

L represents a transverse steadying bar which supports the front end of the reach. This bar connects the arms J of the lower segment in front of the king bolt and is arranged between the tongue of the upper segment and the reach.

$l$ represents a bolt connecting the tongue I and the reach in rear of the steadying bar L.

M, Figs. 1, 2, 3 and 5, represents a spring clamping bar whereby the reach is pressed against the under side of the steadying bar to take up wear and prevent rattling. This clamping bar is arranged transversely underneath the reach and lengthwise underneath the steadying bar. The ends of the clamping bar bear upwardly against dependings lugs $m$ formed on the arms J of the lower segment. The end portions of the clamping bar are connected inside of the depending lugs $m$ with the arms J of the lower segment by vertical bolts $n$. Upon tightening the latter, the middle portion of the clamping bar is drawn upwardly against the reach and the latter is pressed against the under side of the steadying bar. When the axle turns on the king bolt, the front end of the reach slides on the steadying bar and is firmly held against the under side thereof by the clamping bar, which effectually prevents play between these parts. When the reach and the steadying bar have worn to such an extent so as to become loose, they can be tightened by tightening the bolts $n$. The clamping bar is provided at its ends with upturned lips $n'$ which bear against the outer sides of the depending lugs and hold the clamping bar against lateral movement.

O, Figs. 1, 2 and 7 represents perforated ears formed on the front side of the upper segment and provided with sockets $o$ in their upper sides.

$o'$ represents clamping blocks arranged below the perforated ears and bearing against the under side of the lower segment.

$o^2$ represents a vertical bolt arranged in each of the clamping blocks and perforated ears.

$o^3$ represents a rubber block or spring surrounding the bolt $o^2$ and resting with its lower end in the socket of the ear while its upper end bears against a screw nut $o^4$ arranged upon the upper screw threaded end of the bolt $o^2$. Upon tightening the screw nut, the rubber block is compressed, which causes it to exert a constant upward strain upon the clamping block, thereby holding the segments firmly together. Instead of placing the rubber block between the perforated ear and the screw nut, it may be arranged between the outer end of the ear $o$ and the clamping block, as represented in Fig. 8.

In the modified construction of the reach coupling illustrated in Figs. 9 to 11, the tongue of the upper eye extends forwardly across the axle to the upper segment and is connected with the rearwardly converging arms F by lateral braces $p$.

Q represents two steadying bars, each of which extends from one end of the lower segment obliquely inward across the reach to the opposite side thereof where it joins a transverse plate or bar $q$ to which the axle is secured.

R R represent two clamping bars which are arranged underneath these steadying bars and which bear against lugs $r$ formed on each of the oblique steadying bars and are secured to the latter by bolts $r'$. The two clamping bars are preferably formed in one piece as represented in Fig. 10. Upon turning the axle on the king bolt from one extreme position to the other, the front end of the reach travels first between one pair of the steadying and clamping bars and then shifts to the other pair at the middle of its movement.

I claim as my invention—

1. The combination with the axle, the segments, the reach and the king bolt connecting the segments and reach in rear of the axle, of a transverse steadying bar secured to one of the segments and bearing against one side of the reach between the king bolt and the axle, a movable clamping bar bearing against the opposite side of the reach, and clamping bolts by which the movable bar is tightened against the reach and the latter is tightened against the opposite steadying bar, substantially as set forth.

2. The combination with the axle, the segments, the reach and the king bolt connecting the segments and reach in rear of the axle, of a transverse steadying bar secured to one side of the reach and provided near its ends with supports projecting to the opposite side of the reach, a movable clamping bar resting with its ends against said supports, and clamping bolts arranged on the inner ends of said supports and drawing the inner portion of the movable bar against the reach, substantially as set forth.

3. The combination with the axle, the upper and lower segments having arms and eyes in rear of the axle, and the reach secured to the upper segment and terminating with its front end in rear of the axle, of a king bolt connecting the eyes of the segments with the reach, a transverse steadying bar formed on the arms of the lower segment between the axle and the king bolt and bearing upon the front end of the reach, depending lugs formed on the arms of the lower segment, a spring clamping bar bearing upwardly against the lugs and the reach, and bolts whereby the tension of the clamping bar is adjusted, substantially as set forth.

4. The combination with the axle, the upper and lower segments having arms and eyes in rear of the axle, and the reach secured to the upper segment and terminating with its front end in rear of the axle, of a king bolt connecting the eyes of the segments with the reach, a transverse steadying bar formed on the arms of the lower segment between the axle and the king bolt and bearing upon the front end of the reach, depending lugs formed on the arms of the lower segment, a clamping bar arranged underneath the reach and the lugs, lips formed on the clamping bar and bearing against the outer side of the lugs, and bolts connecting the clamping bar with the steadying bar inside of the depending lugs, substantially as set forth.

Witness my hand this 15th day of July, 1892.

CHRISTOPHER C. BRADLEY.

Witnesses:
C. S. BUNNELL,
J. MANNERY.